(12) United States Patent
Genden et al.

(10) Patent No.: US 9,996,353 B2
(45) Date of Patent: Jun. 12, 2018

(54) UNIVERSAL HISTORY BUFFER TO SUPPORT MULTIPLE REGISTER TYPES

(71) Applicant: International Business Machines Corporation, Armonk, NY (US)

(72) Inventors: Michael J. Genden, Austin, TX (US); Hung Q. Le, Austin, TX (US); Dung Q. Nguyen, Austin, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 14/632,441

(22) Filed: Feb. 26, 2015

(65) Prior Publication Data

US 2016/0253177 A1  Sep. 1, 2016

(51) Int. Cl.
*G06F 9/30* (2018.01)
*G06F 9/38* (2018.01)

(52) U.S. Cl.
CPC .......... *G06F 9/3013* (2013.01); *G06F 9/3859* (2013.01); *G06F 9/3863* (2013.01)

(58) Field of Classification Search
CPC ............... G06F 9/3009; G06F 9/30101; G06F 9/30105; G06F 9/30109; G06F 9/30112; G06F 9/30116; G06F 9/30123; G06F 9/3013; G06F 9/3859; G06F 9/3863; G06F 9/30127; G06F 9/461; G06F 9/462; G06F 11/1407; G06F 15/7875
USPC ....................................... 712/228
See application file for complete search history.

(56) References Cited

U.S. PATENT DOCUMENTS

| 5,125,092 A | | 6/1992 | Prener | |
|---|---|---|---|---|
| 5,581,775 A | * | 12/1996 | Katz | ..................... G06F 9/3863 711/200 |
| 5,826,069 A | | 10/1998 | McCullough et al. | |
| 5,860,014 A | | 1/1999 | Cheong et al. | |
| 5,870,612 A | | 2/1999 | Cheong et al. | |
| 6,098,167 A | * | 8/2000 | Cheong | ................. G06F 9/3863 712/217 |

(Continued)

OTHER PUBLICATIONS

Genden et al., "History Buffer with Hybrid Entry Support for Multiple-Field Registers," U.S. Appl. No. 14/632,406, filed Feb. 26, 2015, 49 pages.

(Continued)

*Primary Examiner* — Keith Vicary
*Assistant Examiner* — Shawn Doman
(74) *Attorney, Agent, or Firm* — Van Leeuwen & Van Leeuwen; Steven L. Bennett

(57) ABSTRACT

An approach is provided in which a mapper control unit receives first dispatch information corresponding to a first instruction that identifies a first register and a first register type. The mapper control unit dynamically configures a first history buffer entry to support the first register type and, in turn, stores content from the first register into the first history buffer entry. The mapper control unit then receives second dispatch information corresponding to a second instruction that identifies a second register and a second register type, which is different than the first register type. The mapper control unit dynamically configures a second history buffer entry to support the second register type and, in turn, stores content from the second register into the second history buffer entry.

20 Claims, 16 Drawing Sheets

(56) References Cited

U.S. PATENT DOCUMENTS

| | | |
|---|---|---|
| 6,119,223 A | 9/2000 | Witt |
| 6,128,722 A | 10/2000 | Fry et al. |
| 6,195,746 B1 * | 2/2001 | Nair .................... G06F 9/30094 |
| | | 712/210 |
| 6,370,639 B1 | 4/2002 | Huck et al. |
| 7,962,731 B2 | 6/2011 | Rychlik |
| 8,245,018 B2 | 8/2012 | Nguyen |
| 8,270,599 B2 | 9/2012 | Verghese et al. |
| 8,661,232 B2 | 2/2014 | Penton et al. |
| 9,720,696 B2 | 8/2017 | Chu et al. |
| 2003/0226001 A1 | 12/2003 | Moyer et al. |
| 2004/0015683 A1 * | 1/2004 | Emma .................... G06F 9/3806 |
| | | 712/240 |
| 2004/0177239 A1 | 9/2004 | Clift et al. |
| 2005/0138255 A1 * | 6/2005 | Moyer .................... G06F 13/24 |
| | | 710/260 |
| 2006/0149941 A1 * | 7/2006 | Colavin .................... G06F 8/45 |
| | | 712/229 |
| 2008/0126744 A1 | 5/2008 | Moyer |
| 2008/0189535 A1 | 8/2008 | Agarwal et al. |
| 2008/0244244 A1 | 10/2008 | Tuuk et al. |
| 2009/0276432 A1 | 11/2009 | Hokenek et al. |
| 2014/0006758 A1 | 1/2014 | Rotem et al. |

OTHER PUBLICATIONS

Chadha et al., "History Buffer for Multiple-Field Registers," U.S. Appl. No. 14/632,481, filed Feb. 26, 2015, 49 pages.

* cited by examiner

UNIVERSAL HISTORY BUFFER TO SUPPORT MULTIPLE REGISTER TYPES

BACKGROUND

The present disclosure relates to a dynamic multiple-field history buffer that preserves register content from different register types.

Modern information handling systems typically implement out-of-order microprocessor designs that store register contents at "checkpoints" so the microprocessor can revert back to a register state prior to an interruption if required, such as during a branch instruction. When a processor reaches branch instruction, the processor selects a most likely path and begins to process instructions down the selected path. The processor, however, stores register contents at the branch in case the selected path is the incorrect path and the processor needs to revert back to the register state prior to the mis-predicted path.

Processors may store the register contents at checkpoints in history buffers. Traditional history buffers allow a processor to store the entire contents of a particular register in a history buffer entry, such as storing the entire contents of a general purpose register (GPR) into a single history buffer entry. Each history buffer entry includes a single instruction tag (itag) field that stores an itag value from the GPR, which the processor utilizes to determine which history buffer content should be restored into specific registers if required.

Processors may use several register "types" to store contents, such as general purpose registers, exception and status registers (FPSCR, XER, and CR). The different register types may utilize different data field widths depending upon the data length of what is stored in the registers. As such, traditional architectures utilize a different history buffer for each register type whereby the different history buffers include history buffer entries with data widths matching the different register type data entries.

BRIEF SUMMARY

According to one embodiment of the present disclosure, an approach is provided in which a mapper control unit receives first dispatch information corresponding to a first instruction that identifies a first register and a first register type. The mapper control unit dynamically configures a first history buffer entry to support the first register type and, in turn, stores content from the first register into the first history buffer entry. The mapper control unit then receives second dispatch information corresponding to a second instruction that identifies a second register and a second register type, which is different than the first register type. The mapper control unit dynamically configures a second history buffer entry to support the second register type and, in turn, stores content from the second register into the second history buffer entry.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
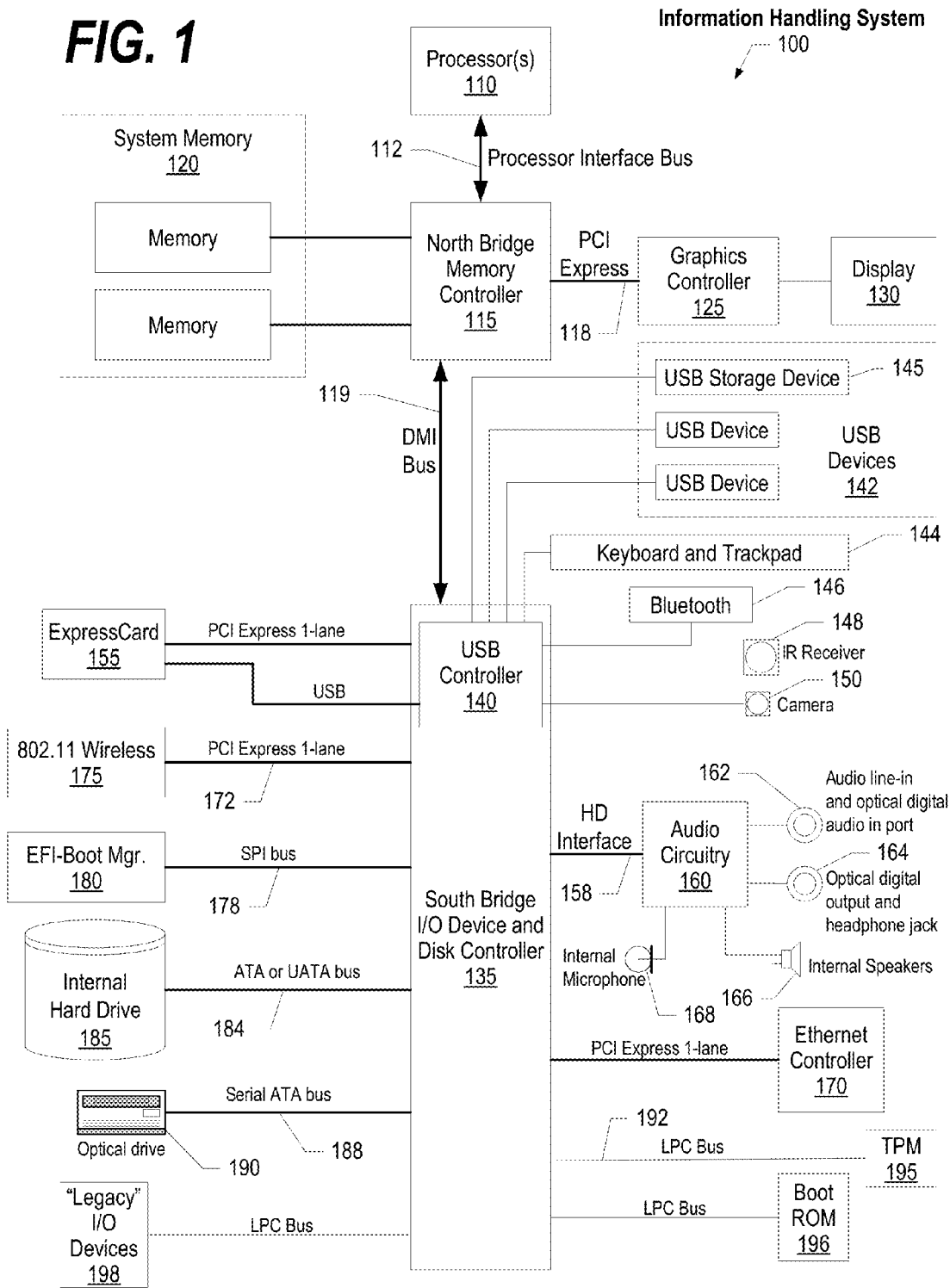
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
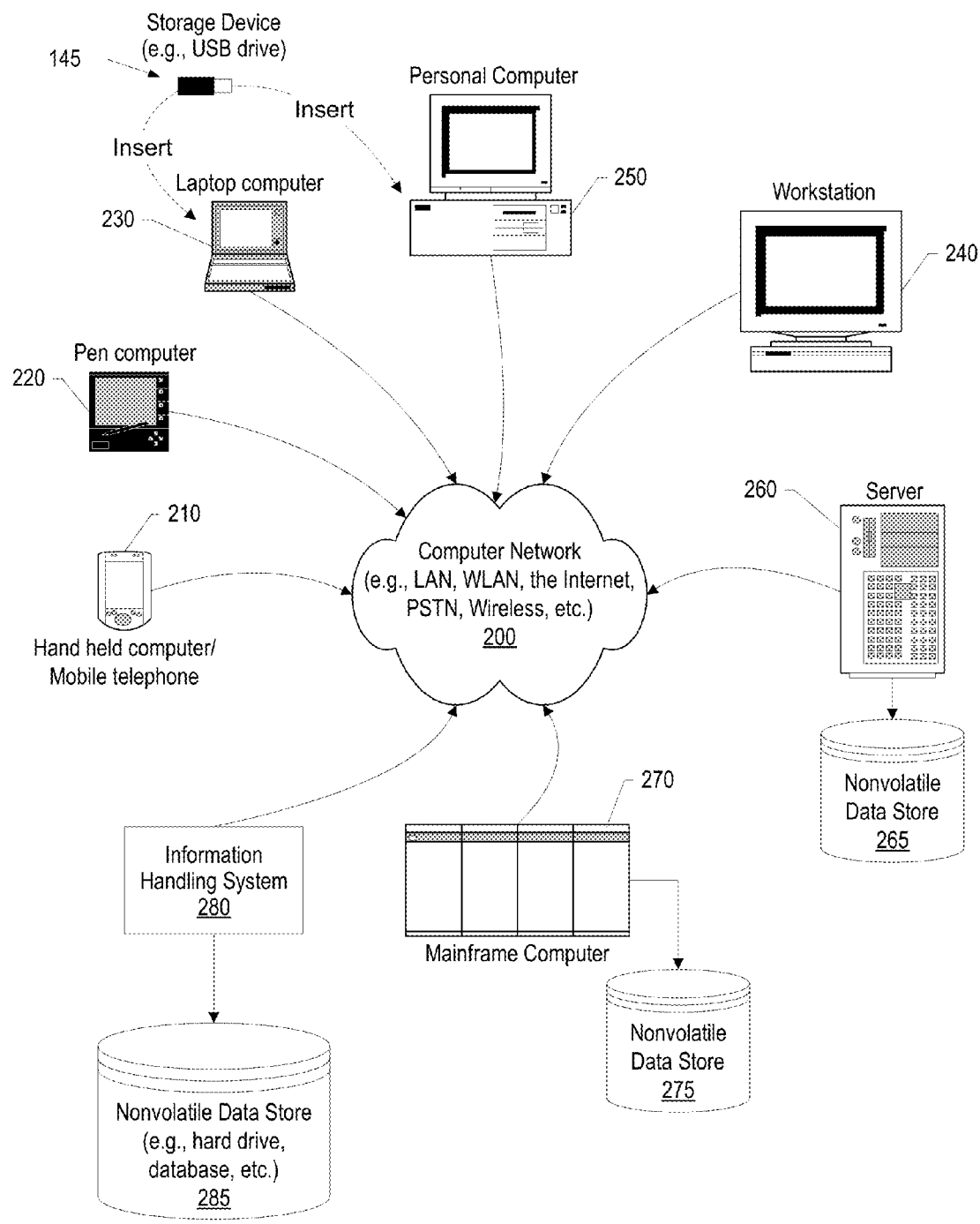
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-16 depict an approach that can be executed on an information handling system. The information handling system includes a mapper control unit and a dynamic history buffer that preserves multi-field register information. The mapper control unit receives dispatch information corresponding to a dispatching instruction targeting registers and register fields. The mapper control unit transfers existing content from the targeted registers and register fields into a history buffer entry that the mapper control unit dynamically configures to store the multi-field content. Each history buffer entry may have multiple field sets, each having their own itag field and variable data width field. In one embodiment, when the dispatch information targets a subset of fields in a register, the mapper control unit transfers the content from the targeted subset of fields to the dynamic history buffer entry and leaves the untargeted register fields available for subsequent instructions to access. As a result, the subsequent instructions are not required to wait until the targeted register contents are produced.

In another embodiment, the dynamic history buffer supports multiple register types having different data widths. In this embodiment, the mapper control unit uses a single dynamic history buffer to preserve register content from different register types by storing a register type indicator in each dynamic history buffer entry that indicates the type of register contents stored in the particular dynamic history buffer. The mapper control unit selects an available dynamic history buffer entry and dynamically assigns the selected entry to a register type based upon the dispatch information received at the time (i.e., history buffer entries not pre-assigned a specific register type).

In yet another embodiment, the dynamic history buffer supports hybrid history buffer entries. A hybrid entry is a single dynamic history buffer entry that includes register information from multiple register types. This embodiment may be utilized, for example, when an instruction targets field subsets of two registers having different register types. In this embodiment, the mapper control unit selects a history buffer entry, stores contents from a first register type in a portion of the selected history buffer entry, stores contents from a second register type in a different portion of the selected history buffer entry, and stores a hybrid type indicator ("H") in the selected history buffer's register type field.

Figure 3:
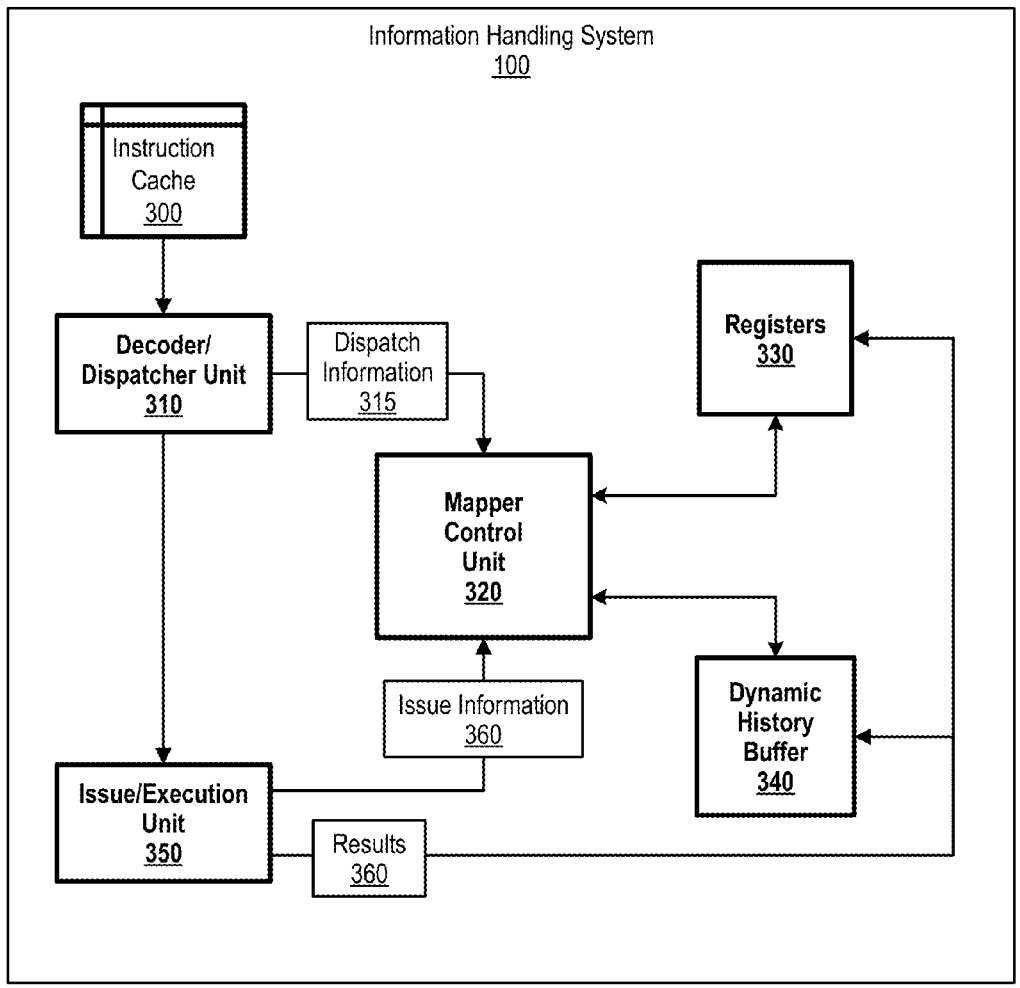
FIG. 3 is an exemplary diagram depicting a mapper control unit that preserves existing content from targeted registers on a per-field basis into a dynamic history buffer.

FIG. 3 is an exemplary diagram depicting a mapper control unit that preserves existing content from targeted registers on a per-field basis into a dynamic history buffer. Information handling system 100 includes instruction cache 300 that stores fetched instructions ready for dispatch. Decoder/dispatcher unit 310 retrieves an instruction from instruction cache 300, dispatches the instruction to issue/execution unit 350, and generates dispatch information 315 to send to mapper control unit 320. Dispatch information 315 includes the instruction's instruction tag (itag), whether the instruction is an interruptible instruction (e.g., a branch instruction), and also includes target register information such as register identifiers and register field identifiers. In one embodiment, dispatch information 315 includes a destination "type" as well as destination "field valid" information, which together determine the type of the history buffer entry being allocated (see FIG. 4 and corresponding text for further details).

Mapper control unit 320 analyzes dispatch information 315 as well as control information corresponding to the targeted register fields in registers 330 to determine whether register content should be preserved into dynamic history buffer 340. For example, if dispatch information 315 indicates that the instruction is interruptible, mapper control unit 320 determines that the targeted register contents should be preserved in order to be able to revert back to a register state prior to the interruptible instruction if needed (see FIGS. 13, 15, and corresponding text for further details).

When mapper control unit 320 determines that the targeted register contents should be preserved, mapper control unit 320 selects an available dynamic history buffer entry in dynamic history buffer 340 and transfers the targeted register(s) contents on a per-field basis into the selected dynamic history buffer entry. In one embodiment, the targeted register contents may reside in different registers with different register types (see FIG. 8 and corresponding text for further details). In turn, once mapper control unit 320 transfers the targeted registers' existing contents, mapper control unit 320 stores dispatch information 315 (or portions thereof) into the targeted register fields.

When issue/execution unit finishes executing the instruction, issue/execution unit 350 sends issue information to mapper control unit 320 and stores the execution results 360 in dynamic history buffer 340 or registers 330, whichever unit includes a corresponding itag value.

Figure 4:
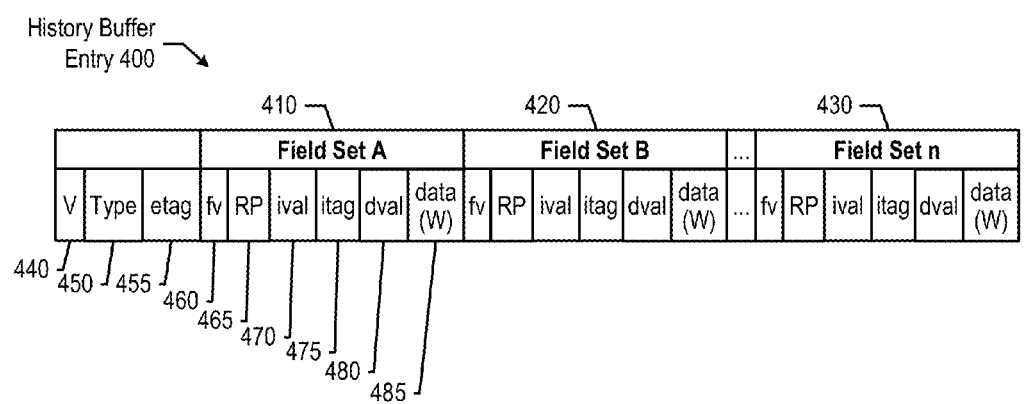
FIG. 4 is an exemplary diagram depicting a history buffer entry included in a dynamic history buffer.

FIG. 4 is an exemplary diagram depicting a history buffer entry included in a dynamic history buffer. As discussed herein, history buffer entry 400 is adapted to store control information and data with varying widths from various register types having varying data field widths. In turn, the dynamic history buffer is utilized to efficiently store/restore register contents that have multiple data fields each having their own control fields.

Each history buffer entry 400 has a set of entry-specific fields 440-455 and multiple field set-specific fields 460-485. Entry valid (V) field 440 is asserted when a corresponding history buffer entry is allocated to store register contents, and cleared on a flush and at completion of an evictor tag (etag). In an embodiment where the dynamic history buffer supports multiple register types, history buffer entry 400 includes register type field 450, which stores a register type indicator corresponding to the information stored in field sets 410, 420, and 430. For example, field 450 may include an "X" if the field set information corresponds to a register type X register, and may include a "Y" if the field set information corresponds to a register type Y register (see FIG. 6 and corresponding text for further details). In one embodiment, mapper control unit 320 analyzes a destination "type" as well as destination "field valid" information in dispatch information 315 to determine the type of the history buffer entry to allocate.

In another embodiment, history buffer entry 400 may be used as a hybrid history buffer entry and include information from multiple register types. For example, field set A 410 and field set B 420 may include information corresponding to a register type X register, and field set n 430 may include information corresponding to a register type Y register. In this embodiment, field 450 may include an "H" to indicate a hybrid register (see FIG. 8 and corresponding text for further details). In this embodiment, instructions and their register targets are analyzed during a high-level architectural design phase to identify those instructions that may utilize the hybrid history buffer entry embodiment as discussed herein (see FIG. 16 and corresponding text for further details).

Evictor tag (etag) 455 includes an instruction tag (itag) of an instruction that targeted the register whose data is preserved in history buffer entry 400. For example, if an instruction with an itag of "50" targets register A and the process preserves existing content in register A by storing the existing content into history buffer entry 400, the mapper control unit stores "50" in etag field 455 because "50" identifies the instruction responsible for evicting the existing content from register A (see FIG. 10 and corresponding text for further details).

Field set A 410, along with each of the field sets B 420 and n 430, each includes a set of control fields 460 through 480 and a data field 485. As discussed herein, a "field set" includes a set of control fields and a data field (460-485) and history buffer entry 400 includes multiple field sets (410, 430, 440, etc.) and an evictor tag (etag 455).

Field valid (fv) field 460 indicates that the corresponding field set's contents are valid. Recovery pending (RP) field 465 indicates that the field set should be restored into a corresponding register during a flush (see FIGS. 13, 15, and corresponding text for further details). Itag valid (ival) field 470 indicates that the itag value in itag field 475 is valid. Itag (instruction tag) field 475 stores an itag value of an instruction (copied from the targeted register field) that generates the field set's data (stored in data 485). Data valid (dval) field 480 indicates that the data stored in data field 485 is valid. In one embodiment, data field 485 is a variable length data field and supports multiple register types. For example, a first register type may store data in 8-byte chunks and a second register type may store data in 32-byte chunks. In this example, mapper control unit 320 adjusts the size of data field 485 based upon the size of the data to be stored in data field 485. As discussed herein, each of field sets A 410, B 420, and n 430 may store data with different data widths.

Figure 5:
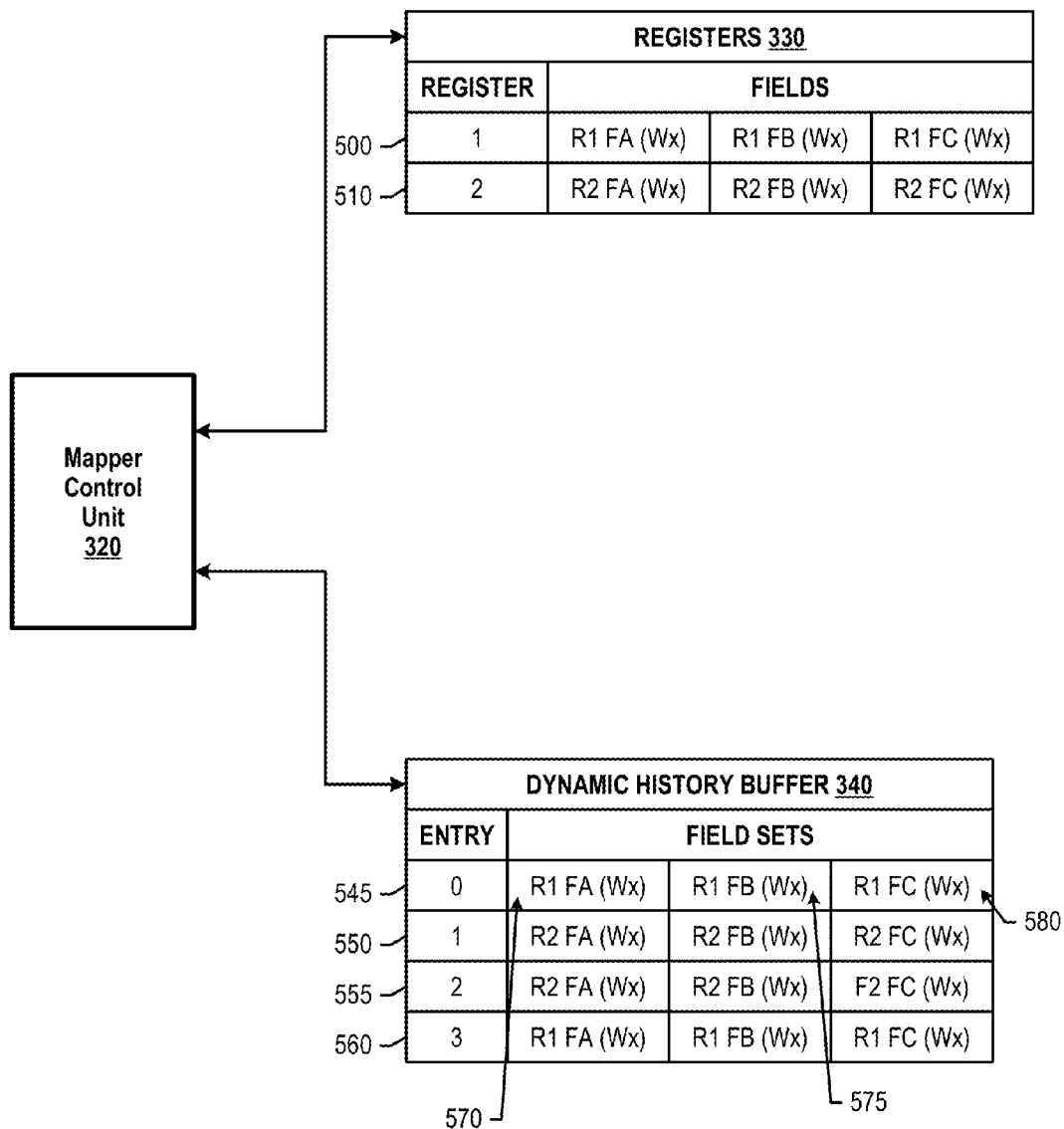
FIG. 5 is an exemplary diagram that depicts one embodiment of a dynamic history buffer that supports multiple-field registers having the same register type.

FIG. 5 is an exemplary diagram that depicts one embodiment of a dynamic history buffer that supports multiple-field registers having the same register type. In this embodiment, dynamic history buffer 340 supports registers that have multiple fields, and each of the fields include a set of control bits and corresponding data bits.

Registers 330 include register 1 500 and register 2 510. Each of the registers include three fields that have a data width of "Wx". Register 1 500 includes register 1 field A (R1 FA), register 1 field B (R1 FB), and register 1 field C (R1 FC). For example, register 1 may be a register such as an exception and status register, which an instruction may target a subset of the register fields but not all of the register fields. Register 2 510 is the same register type as register 1 500.

When mapper control unit 320 needs to preserve field information in register 1 500, mapper control unit 320 selects an available history buffer entry (e.g., entry 545), and stores the control contents and data contents (if available) of each of register 1 500's fields into history buffer entry 545. In an embodiment where an instruction targets a subset of register 1 500's fields (e.g., R1 FA and R1 FB), mapper control unit 320 stores the targeted field information in history buffer 545 and keeps the untargeted fields (e.g. R1 FC) available for other instructions to access.

Mapper control unit 320 formats history buffer entry to store three fields (e.g., register type X) and stores register 1's fields A, B, and C into entry 545's field sets 570, 575, and 580. Similarly, when mapper control unit 320 needs to preserve field information in register 2 510, mapper control unit 320 selects the next available history buffer entry (e.g., entry 550), and stores register 2 510's contents accordingly. Mapper control unit 320 proceeds to store register 1 500 and register 2 510 contents in history buffers 560 and 555, respectively, based upon received dispatch information to preserve targeted register fields.

Figure 6:
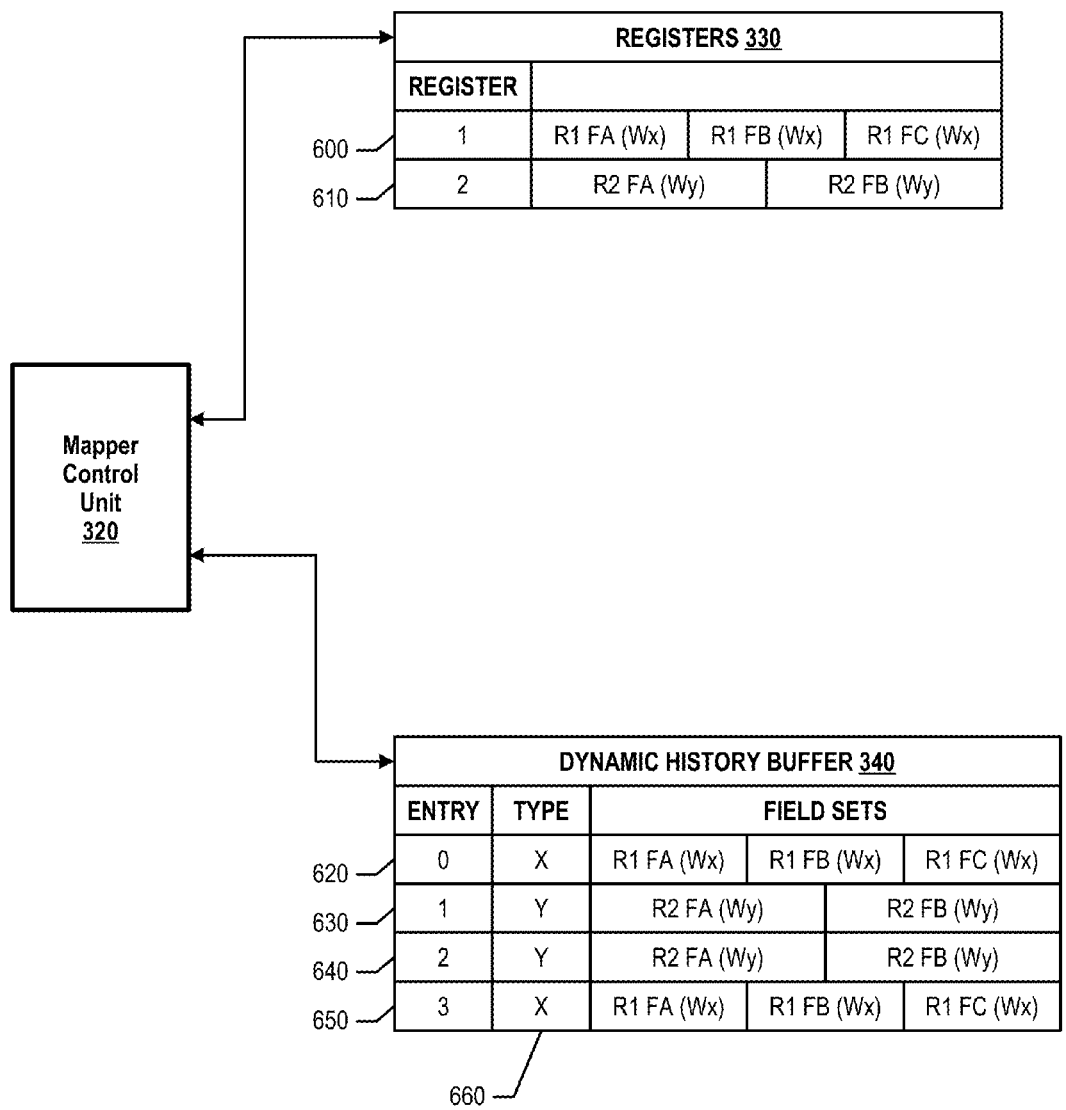
FIG. 6 is an exemplary diagram that depicts another embodiment of a dynamic history buffer that supports multiple register types.

FIG. 6 is an exemplary diagram that depicts another embodiment of a dynamic history buffer that supports multiple register types. In this embodiment, dynamic history buffer 340 supports registers that are different register types and may also have different data widths. FIG. 6 shows that register 1 600 is a different register type (type X) than register 2 610 (type Y). For example, register 1 600 may be a floating point exception and status register and register 2 610 may be a fixed point status register. Register 1 600 has three field sets each having their own control fields and a data width of "Wx," whereas register 2 610 has two field sets each having their own control fields and a data width of "Wy." In one embodiment, data widths may vary for fields within a given register type.

Because dynamic history buffer 340 is dynamic in nature, mapper control unit 320 preserves both register 1 600's information and register 2 610's information into different history buffer entries. In order to track which register types are stored in which history buffer entries, mapper control unit 320 sets a type indicator in column 660. As can be seen, history buffer entries 620 and 650 include content from register 1 600 and history buffer entries 630 and 640 include content from register 2 610. Mapper control unit 320 selects a next available history buffer entry to preserve data from either register 1 600 or register 2 610, whichever register is being targeted by a dispatching instruction. In short, the history buffer entries are not pre-determined to store specific register type content.

Figure 7:
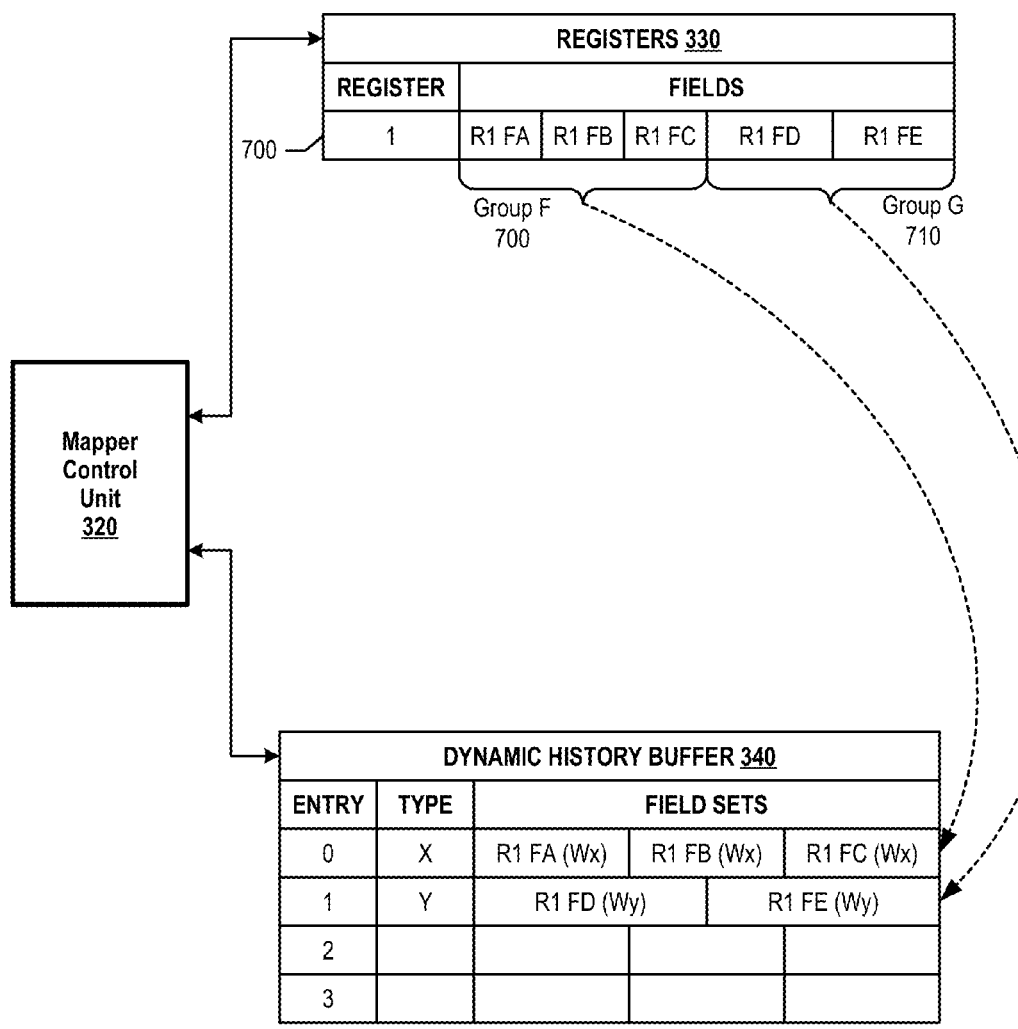
FIG. 7 is an exemplary diagram that depicts a variation of the embodiment shown in FIG. 6.

FIG. 7 is an exemplary diagram that depicts a variation of the embodiment shown in FIG. 6. At times, registers 330 may include a register with a large number of fields. In this embodiment, mapper control unit 320 may organize the register's fields into groups and treat each group as sub-registers for preservation purposes to optimize the history buffer width design. In one embodiment, the field grouping is performed during the high-level architectural design phase based upon which fields are concurrently targeted by particular instructions. For example, an instruction may target the first three fields in register 1 700 (group F 700) and a different instruction may target the last two fields in register 1 700 (group G 710). As such, mapper control unit 320 treats each group as separate registers and preserves their contents into dynamic history buffer 340 accordingly.

Figure 8:
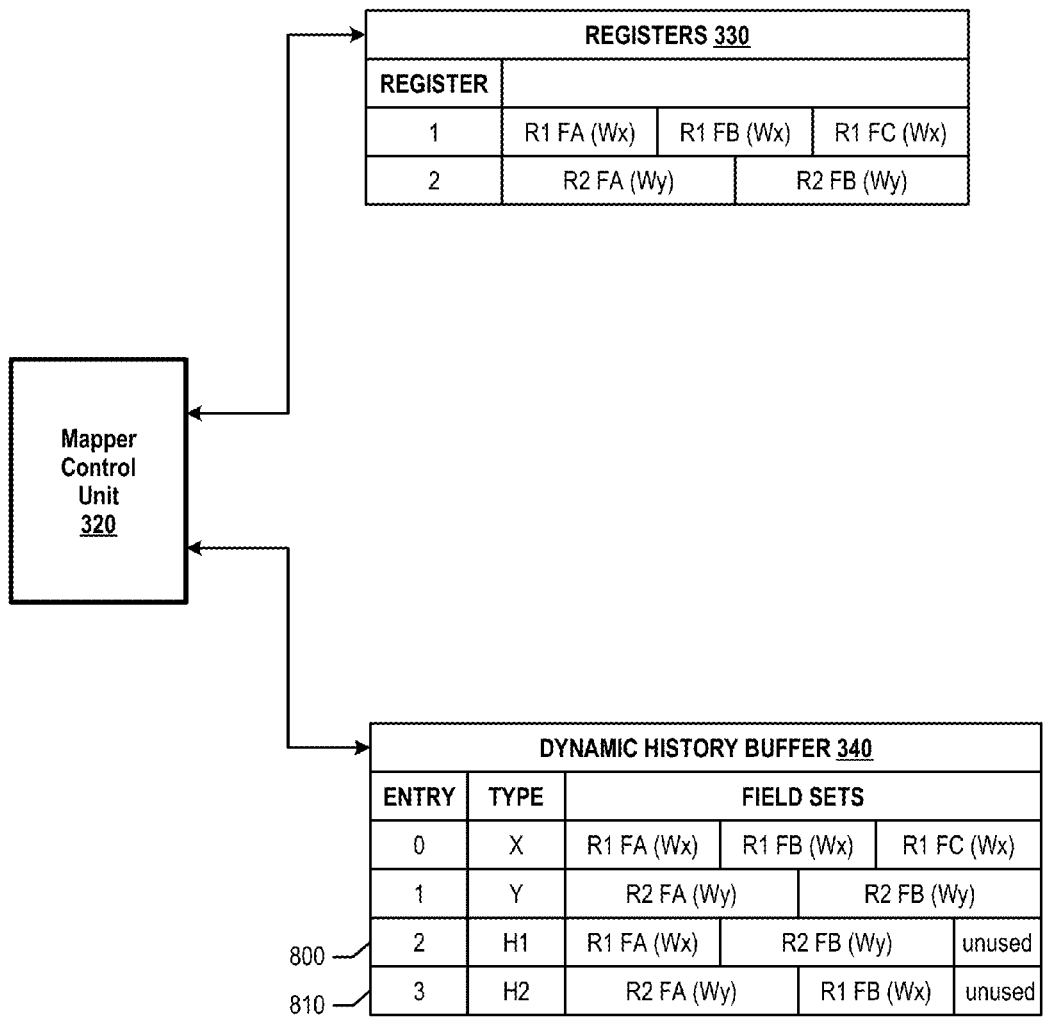
FIG. 8 is an exemplary diagram that depicts a dynamic history buffer that utilizes hybrid history buffer entries to support multi-register type registers architectures.

FIG. 8 is an exemplary diagram that depicts a dynamic history buffer that utilizes hybrid history buffer entries to support multi-register type registers architectures. In one embodiment, an instruction may target a portion of one register type and a portion of another register type. For example, a fixed-point recording instruction, updates both a Fixed-Point status register and a Condition Register. In this example, mapper control unit 320 preserves the contents from the two different register types into a single history buffer entry.

Mapper control unit 320 receives dispatch information from an instruction that targets register 1's field A and register 2's field B, each having different data widths Wx and Wy, respectively. In turn, mapper control unit 320 concurrently preserves the targeted registers' content in history buffer entry 800 and stores an "H1" (to distinguish between two hybrid entry types) as the register type to indicate that the history buffer entry includes content from multiple register types X and Y. Likewise, mapper control unit 320 receives dispatch information corresponding to a different instruction that targets register 1's field B and register 2's field A. In turn, mapper control unit 320 concurrently preserves the register information in history buffer entry 810 and stores an "H2" as the register type to indicate the history buffer entry stores information from multiple register types (see FIG. 14 and corresponding text for further details).

FIGS. 9 through 13 are exemplary drawings that depict the mapper control unit receiving dispatch information corresponding to dispatching instructions and preserving register information into history buffer entries accordingly. FIGS. 9 through 13 show preservation of control information from registers 330 to dynamic history buffer 340, but do not show preservation or storage of data for simplicity purposes. As those skilled in the art can appreciate, the data is stored with its corresponding control information when the data becomes available (e.g., after instruction execution).

Register 330 includes two fields A 925 and B 930 with corresponding control information. Each of the fields include history bits (935, 950), itag valid (ival) bits (940, 955), and instruction tag (itag) bits (945, 950). A register field's history bit is asserted when an interruptible instruction targets a different field in the register, resulting in field's contents not being preserved but needing to be preserved when a subsequent instruction targets the field, regardless of whether the subsequent instruction is interruptible (see FIGS. 11, 12, and corresponding text for further details).

Figure 9:
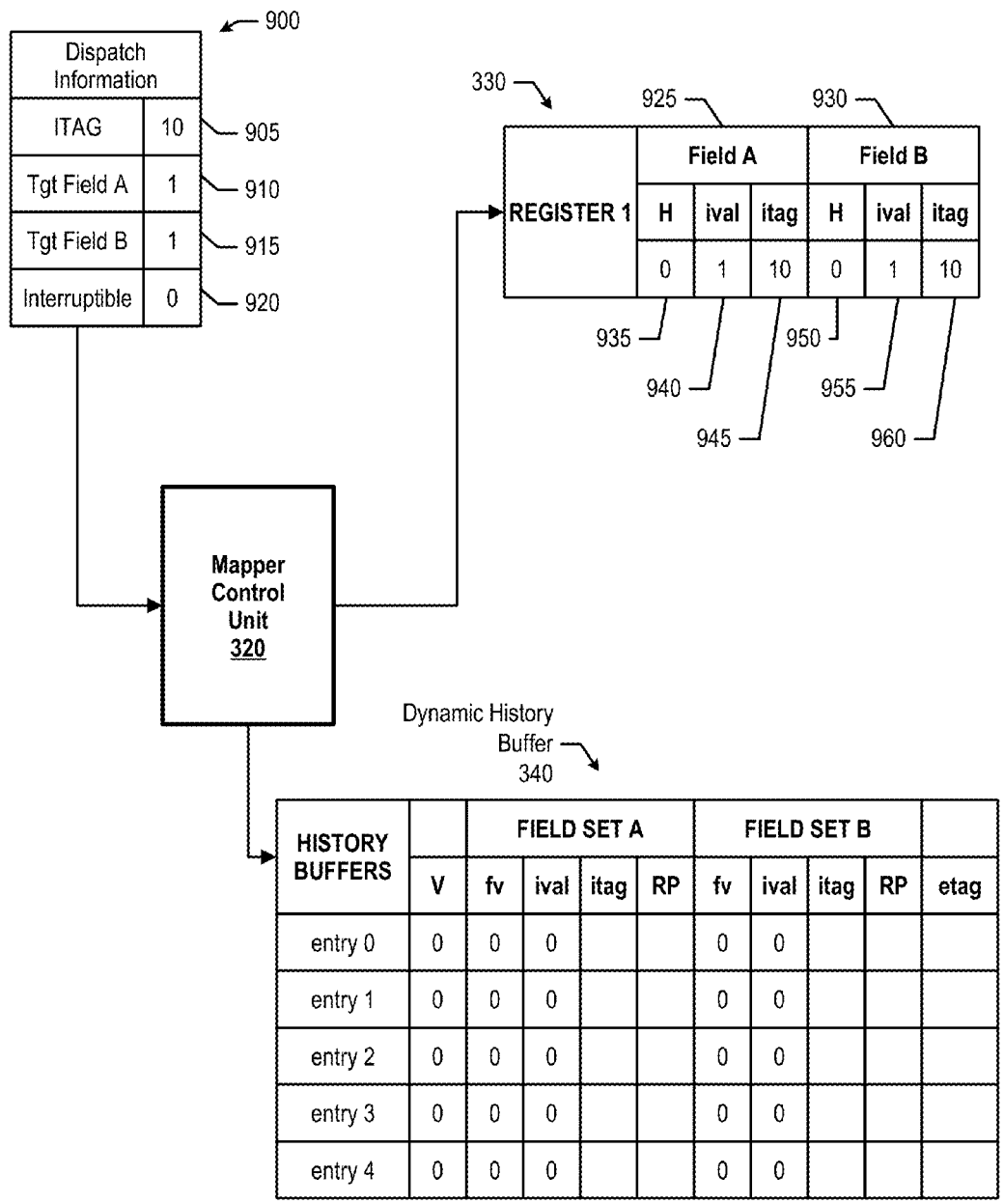
FIG. 9 is an exemplary diagram depicting a mapper control unit processing dispatch information that targets multiple register fields.

Turning to FIG. 9, FIG. 9 shows mapper control unit 320 receiving dispatch information 900 corresponding to a dispatching instruction with an itag of 10 (905). The instruction targets both of register 1 330's fields A and B (910, 915) and the instruction is not an interruptible instruction (920). In turn, mapper control unit 320 stores an itag of 10 in register 330's fields 945 and 950 and sets instruction valid (ival) bits 940 and 955. Mapper control unit 320 does not store information in dynamic history buffer 340 at this point because register 330 started at an initial state with no valid content to preserve.

Figure 10:
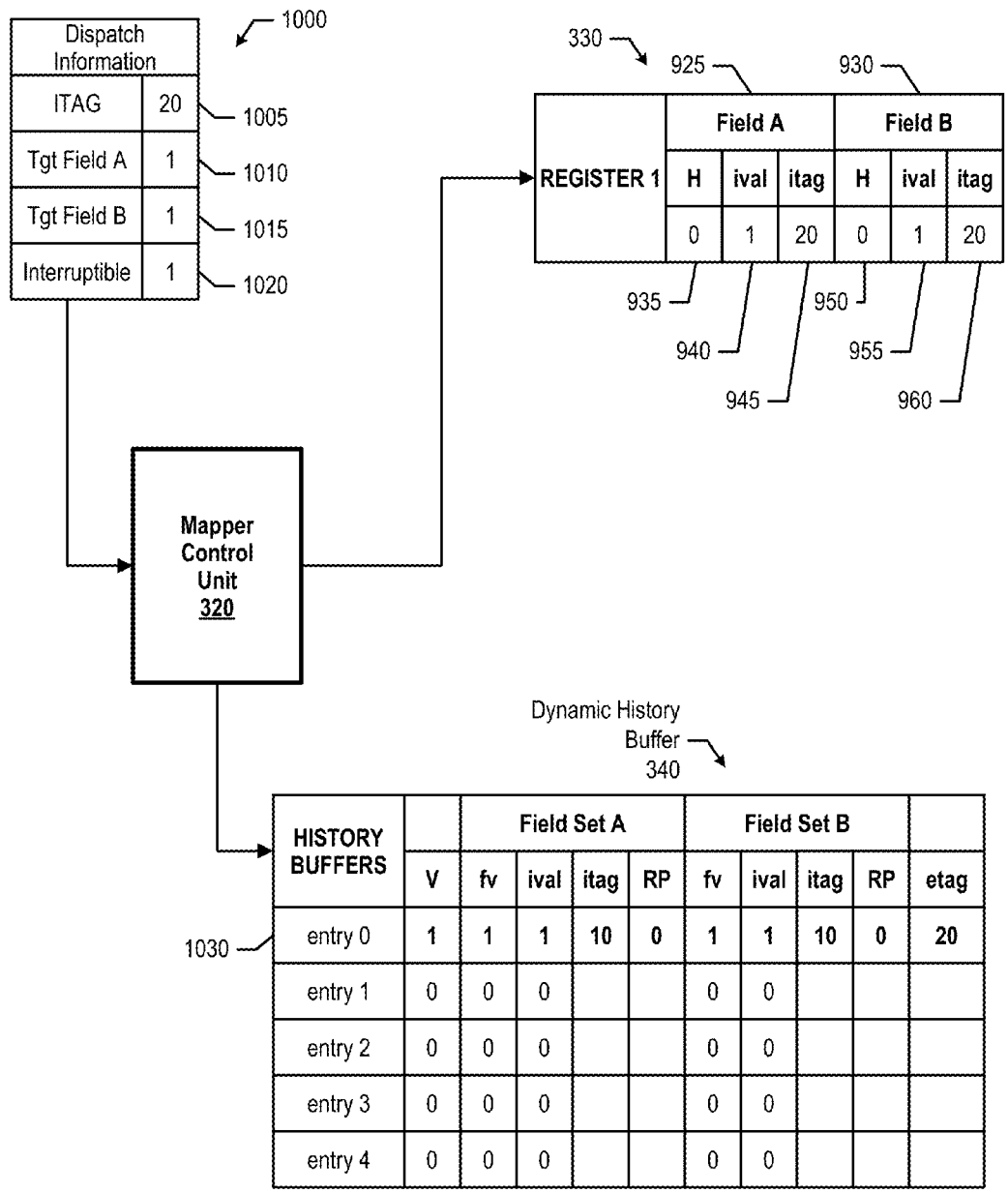
FIG. 10 is an exemplary diagram depicting a mapper control unit processing dispatch information from an interruptible instruction.

Turning to FIG. 10, mapper control unit 320 receives dispatch information 1000 corresponding to a dispatching instruction with an itag of 20 (1005), the instruction is targeting both of register 1 330's fields A and B (1010, 1015) and the instruction is interruptible (1020). Because the instruction is interruptible, mapper control unit 320 preserves register 330's targeted field's A and B information (from FIG. 9) into history buffer 340's entry 1030. As can be seen, history buffer entry 1030 indicates a valid entry (V bit set), and includes register information in field set A and field set B (e.g., itag of 10 in each field set). In addition, mapper control unit 320 stored "20" in entry 1030's etag field to indicate that the instruction with an itag of 20 is the instruction responsible for evicting the content from the register fields.

Once mapper control unit 320 preserves the register information in history buffer entry 1030, mapper control unit 320 writes the dispatch information into register 330's targeted fields. Mapper control unit 320 stores an itag of 20 in fields 945 and 950 (from dispatch information 1000) and sets instruction valid (ival) bits 940 and 955. History bits 935 and 950 are not set at this point because the register fields' contents were stored in dynamic history buffer 340.

Figure 11:
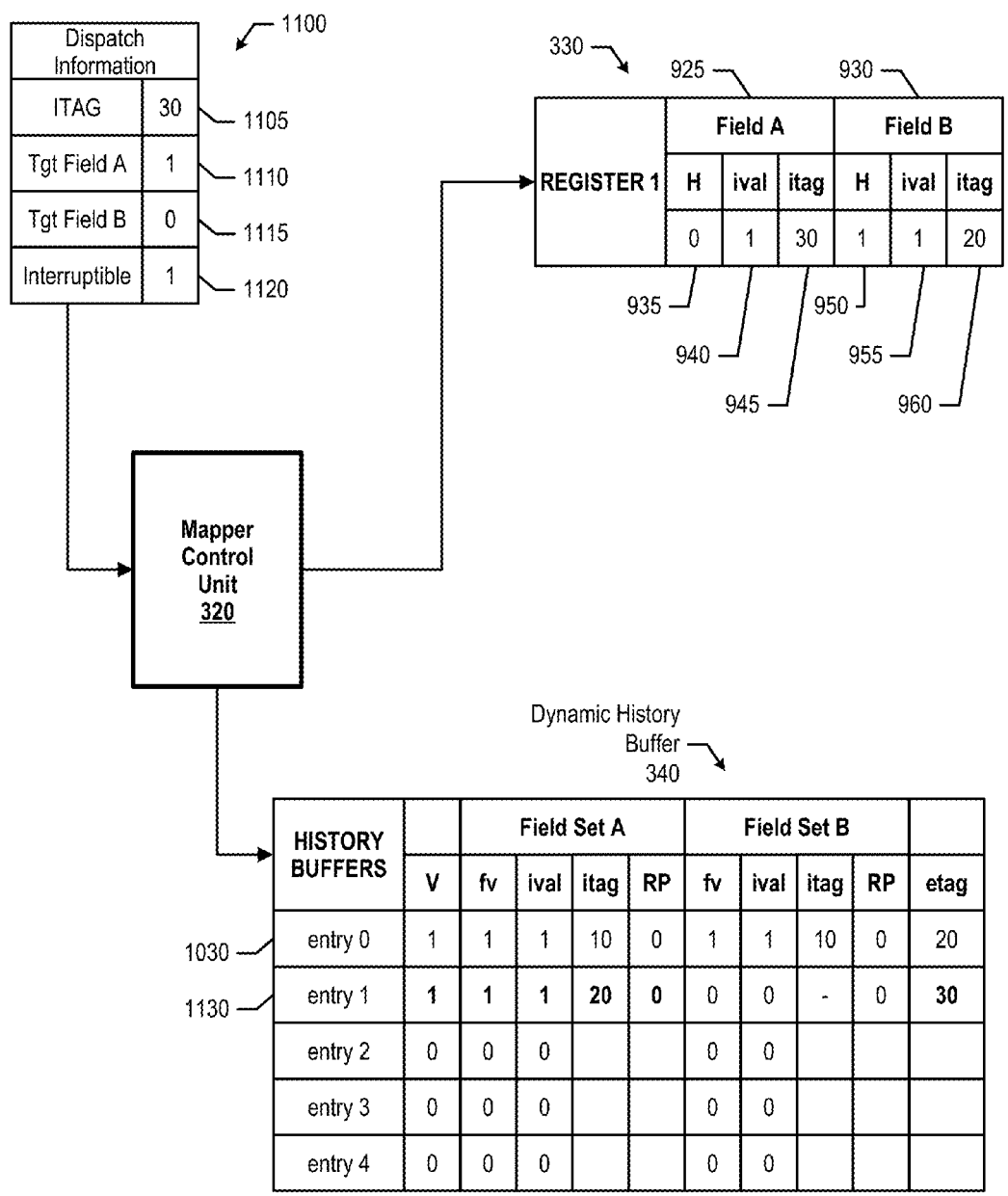
FIG. 11 is an exemplary diagram depicting a mapper control unit preserving register content of a targeted register field that has an asserted history bit.

Turning to FIG. 11, Mapper control unit 320 receives dispatch information 1100 corresponding to a dispatching instruction with an itag of 30 (1105), the instruction is targeting register 1 330's field A but not field B (1110, 1115) and the instruction is interruptible (1120). As such, mapper control unit 320 preserves register 330's target field A information (from FIG. 10) into history buffer 340's entry 1130 and stores a "30" in entry 1130's etag field to correspond with itag 30 in 1105. As discussed previously, when mapper control unit 320 is in the process of preserving content from a subset of targeted fields in a register, the untargeted fields are available to other instructions to access. As such, target field B 930 is available to other instructions for which to write or read while mapper control unit 320 preserves the contents of field A 925.

Once mapper control unit 320 preserves the register field A's information in history buffer entry 1130, mapper control unit 320 writes the dispatch information into the targeted register field A 925, which includes storing an itag of 30 in field 945. In addition, mapper control unit sets history Field B 930's history bit 950 because field B 930's contents were not preserved in history buffer entry 1130 and, therefore, need to be preserved when a subsequent instruction targets field B 930 (see FIG. 12 and corresponding text for further details).

Figure 12:
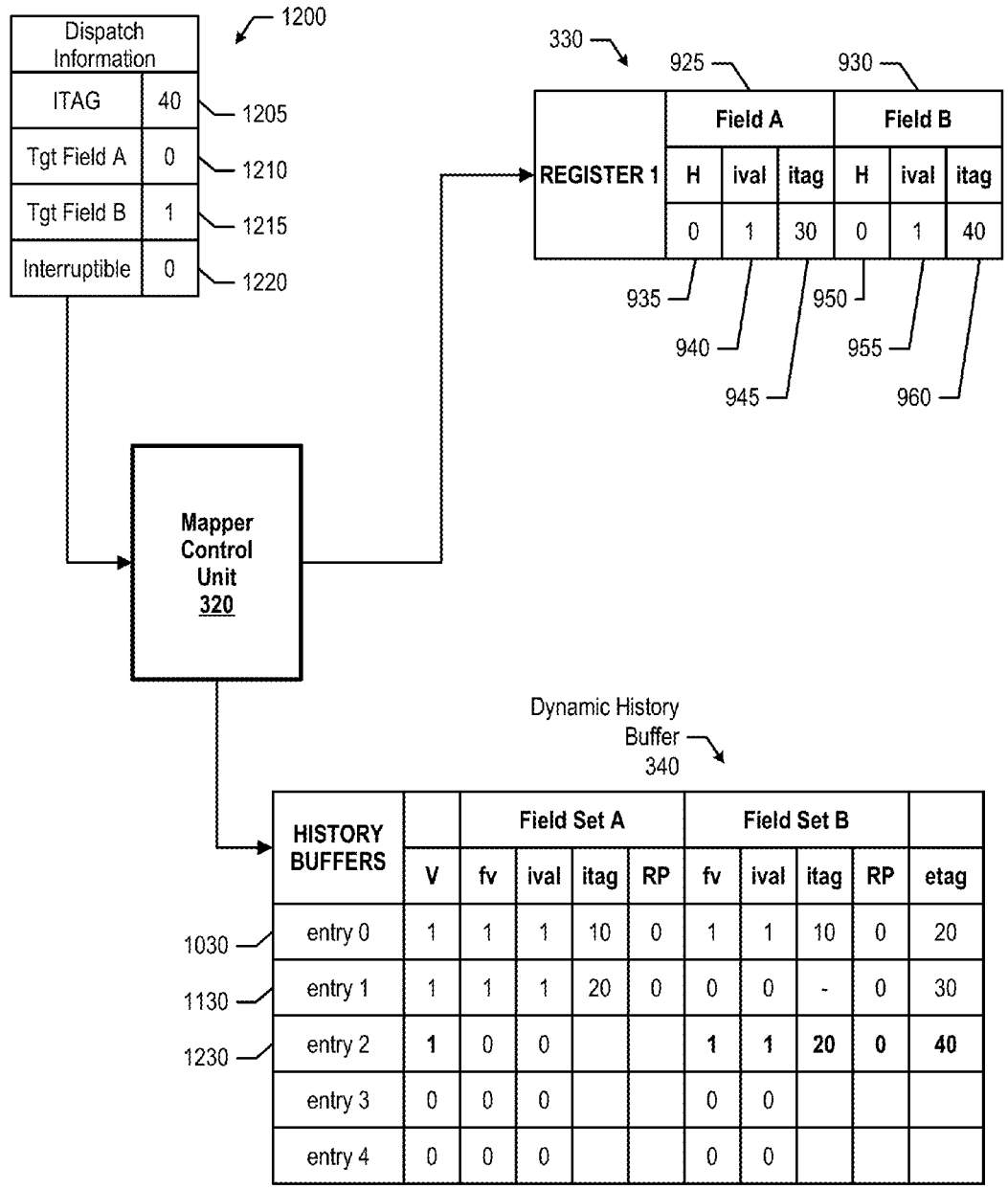
FIG. 12 is an exemplary diagram depicting a mapper control unit processing dispatch information that targets a subset of register fields.

Turning to FIG. 12, mapper control unit 320 receives dispatch information 1200 corresponding to a dispatching instruction with an itag of 40 (1205), the instruction is targeting register 1 330's field B but not field A (1210, 1215) and the instruction is not interruptible (1220). Although the instruction is not interruptible, field B 930's history bit was set in FIG. 11, indicating that the contents were not preserved and need to be preserved when field B 930 is a target for a subsequent instruction. As such, mapper control unit 320 preserves register 330's target field B information (from FIG. 11) into history buffer 340's entry 1230 and stores a "40" in entry 1230's etag field to indicate that the instruction with an itag of 40 is the cause of the eviction.

Once mapper control unit 320 preserves the register field B's information in history buffer entry 1230, mapper control unit 320 writes the dispatch information into the targeted register field B 930, such as storing an itag of 40 in field 960.

Figure 13:
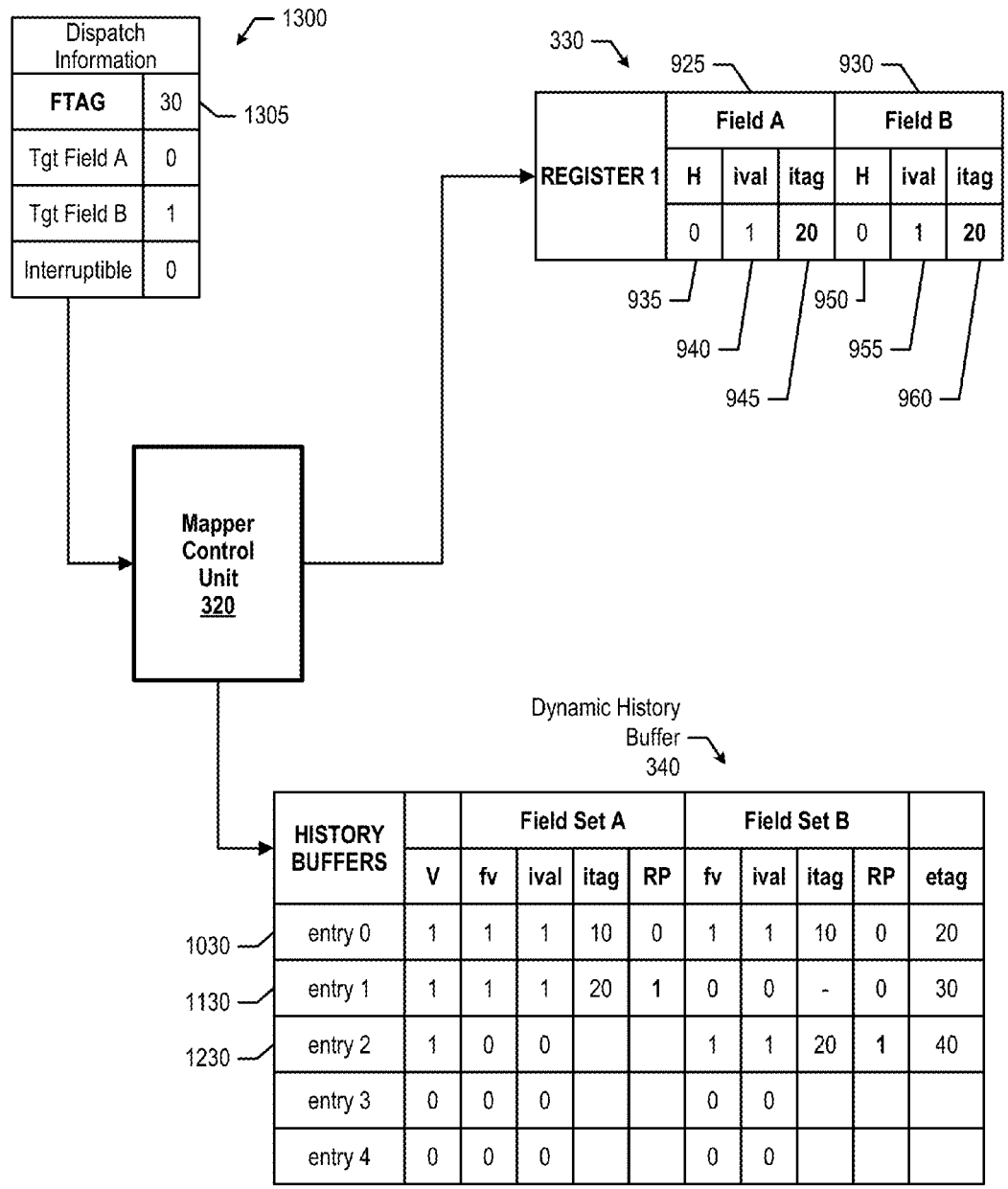
FIG. 13 is an exemplary diagram depicting a mapper control unit processing a flush tag.

Turning to FIG. 13, mapper control unit 320 receives dispatch information 1300 that includes a flush tag (ftag) of 30, indicating that mapper control unit 320 needs to restore register 330 to a state prior to the dispatch of instruction tag 30. As such, mapper control unit 320 asserts a recovery pending (RP) bit in dynamic history buffer 340 for each history buffer entry field that has an itag value older than the ftag value of 30 in each entry that has an etag value the same as or younger than the ftag value of 30. Entries 1130 and 1230 have etag values the same as or younger than ftag 30, and also have an itag value "20" that is older than ftag 30. Therefore, mapper control unit 320 sets the RP bit in both history buffer entries 1130 and 1230.

Mapper control unit 320, in turn, restores the fields in dynamic history buffer 340 that have a set RP bit into registers 330. As such, mapper control unit 320 restores history buffer entry 1130's field set A into register 330's field A 925, and restores history buffer entry 1230's field set B into register 330's field set B 930 (see FIG. 15 and corresponding text for further details).

Figure 14:
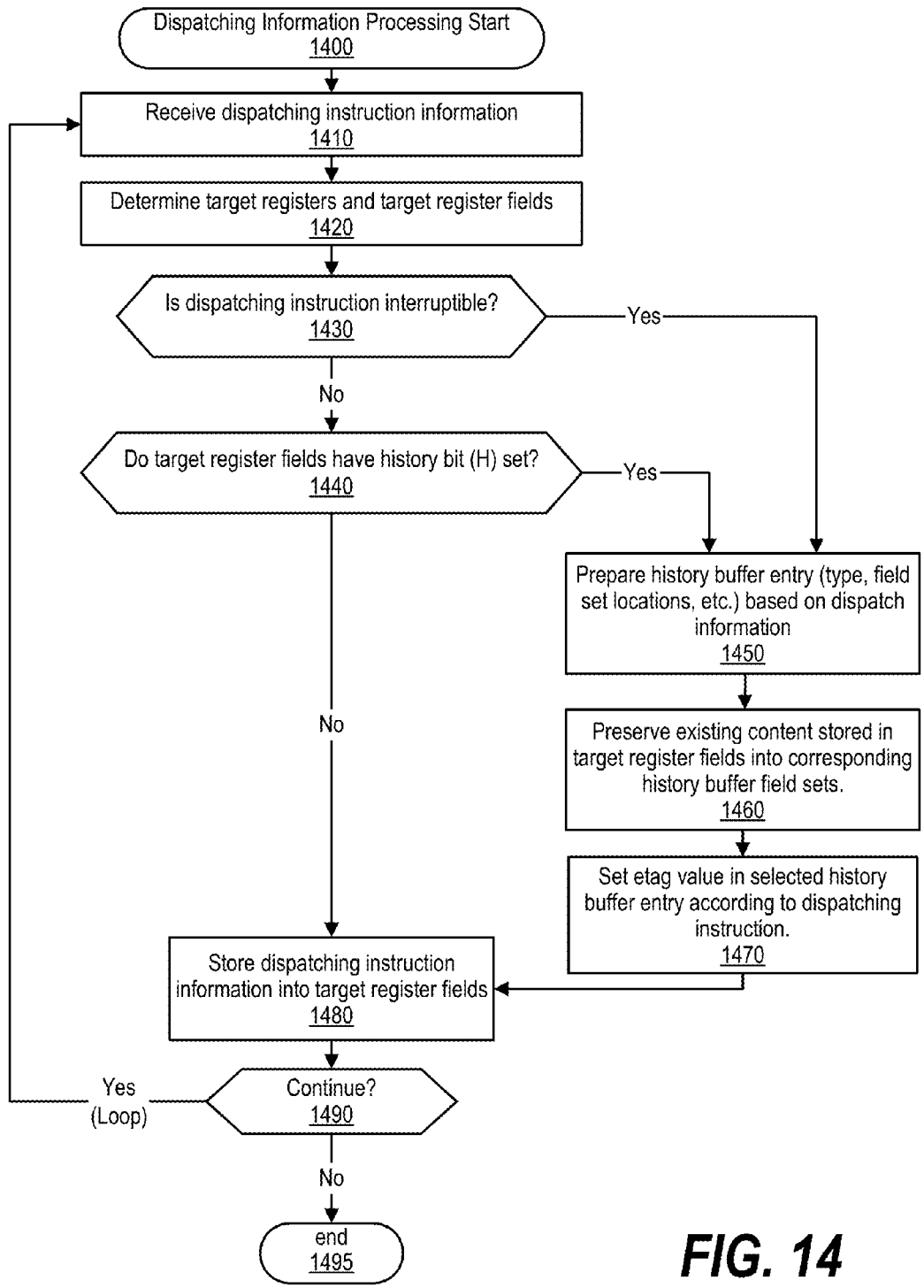
FIG. 14 is an exemplary flowchart depicting steps taken to preserve content stored in targeted register fields into history buffer entries based upon dispatch information of dispatching instructions.

FIG. 14 is an exemplary flowchart depicting steps taken to preserve content stored in targeted register fields into history buffer entries based upon dispatch information of dispatching instructions. Processing commences at 1400, whereupon the process receives the dispatching information at step 1410, such as from decoder/dispatcher unit 310 shown in FIG. 3. At step 1420, the process determines registers/register fields that are targeted by the dispatching instruction. For example, the dispatch information may indicate that the instruction is targeting register 1, fields A, B, and register 2, field C.

The process determines whether the dispatching instruction is an interruptible instruction, such as a branch instruction (decision 1430). As discussed previously, processing determines whether the instruction is an interruptible instruction because, if so, the process stores the target register field's contents in a history buffer entry in case the process needs to revert back to a register state prior to the interruptible instruction, such as when the process mispredicts which branch to pursue.

If the dispatching instruction is an interruptible instruction, then decision 1430 branches to the 'yes' branch whereupon, at step 1450, the process selects an available history buffer entry and configures the selected history buffer entry based upon the dispatch information. For example, if the dispatch information indicates that the process will be preserving content from multiple register types based on the destination information received form the dispatcher, the process prepares the selected history buffer entry to be a hybrid entry.

At step 1460, the process transfers the content stored in the targeted register fields to the selected history buffer field sets, which includes independent itag values and data if available). At step 1470, the process sets an evictor tag (etag) value in the selected history buffer entry according to the dispatching instruction's instruction tag (itag) (see FIG. 10 and corresponding text for further details).

Referring back to decision 1430, if the dispatching instruction is not an interruptible instruction, decision 1430 branches to the 'no' branch whereupon the process determines as to whether the targeted register fields have a history bit (H) asserted (decision 1440). As discussed earlier, the history bit indicates that the register field contents need to be preserved even when the targeting instruction is not interruptible (see FIGS. 11, 12, and corresponding text for further details).

If the targeted register fields have an asserted history bit, then decision 1440 branches to the 'yes' branch whereupon the process performs steps 1450, 1460, and 1470 as discussed above. On the other hand, if the targeted register fields do not have an asserted history bit, then decision 1440 branches to the 'no' branch.

At step 1480, the process stores the dispatching instruction information into the targeted register fields. The process determines as to whether to continue processing dispatch information (decision 1490). If the process should continue, then decision 1490 branches to the 'yes' branch, which loops back to receive and process more dispatch information. This looping continues until the process should terminate, at which point decision 1490 branches to the 'no' branch and processing thereafter ends at 1495.

Figure 15:
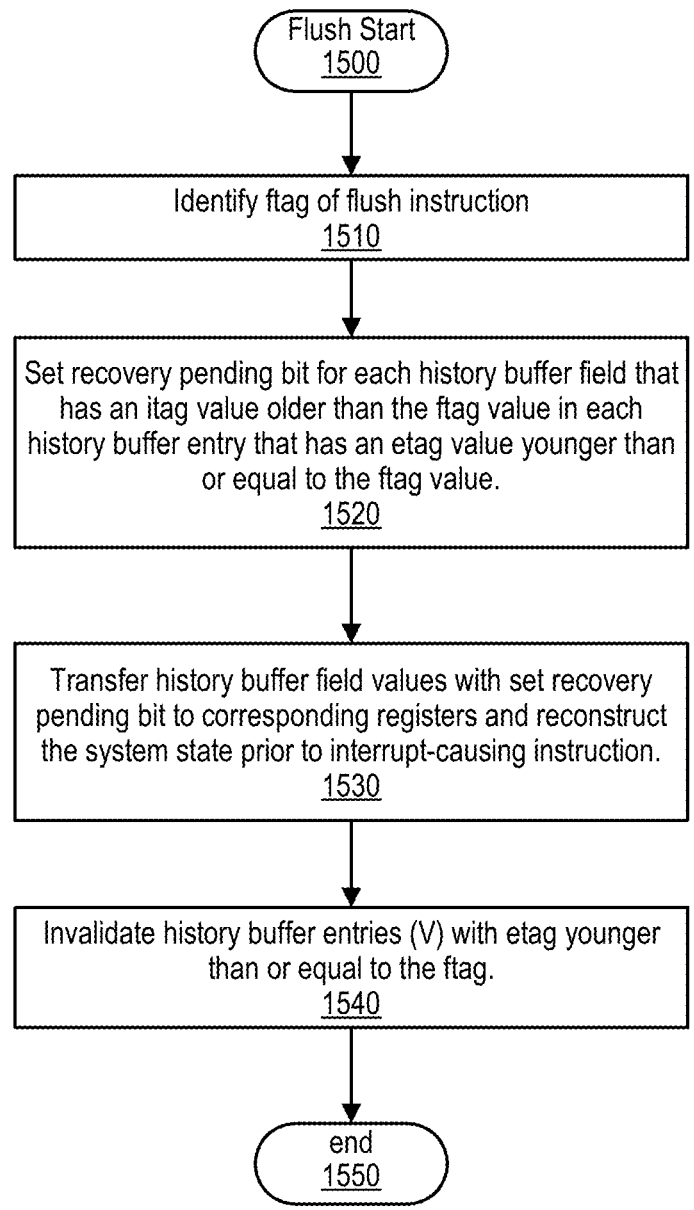
FIG. 15 is an exemplary diagram depicting steps to restore register states in response to receiving dispatch information that indicates a flush.

FIG. 15 is an exemplary diagram depicting steps to restore register states in response to receiving dispatch information that indicates a flush. Processing commences at 1500 whereupon, at step 1510, the process receives dispatch information that includes a flush tag (ftag). At step 1520, the process sets a recovery pending (RP) bit in the dynamic history buffer for each history buffer field set that has an itag value older than the ftag value in each history buffer entry that has an etag value younger than or equal to the ftag value (see FIG. 13 and corresponding text for further details).

At step 1530, the process transfers history buffer field content from history buffer field sets with their recovery pending bit set to corresponding register fields to reconstruct the system state (register values) prior to a previous interrupt-causing instruction. At step 1540, the process invalidates the restored history buffer entries (V) with an etag value younger than or equal to the ftag value, and FIG. 15 processing thereafter ends at 1550.

Figure 16:
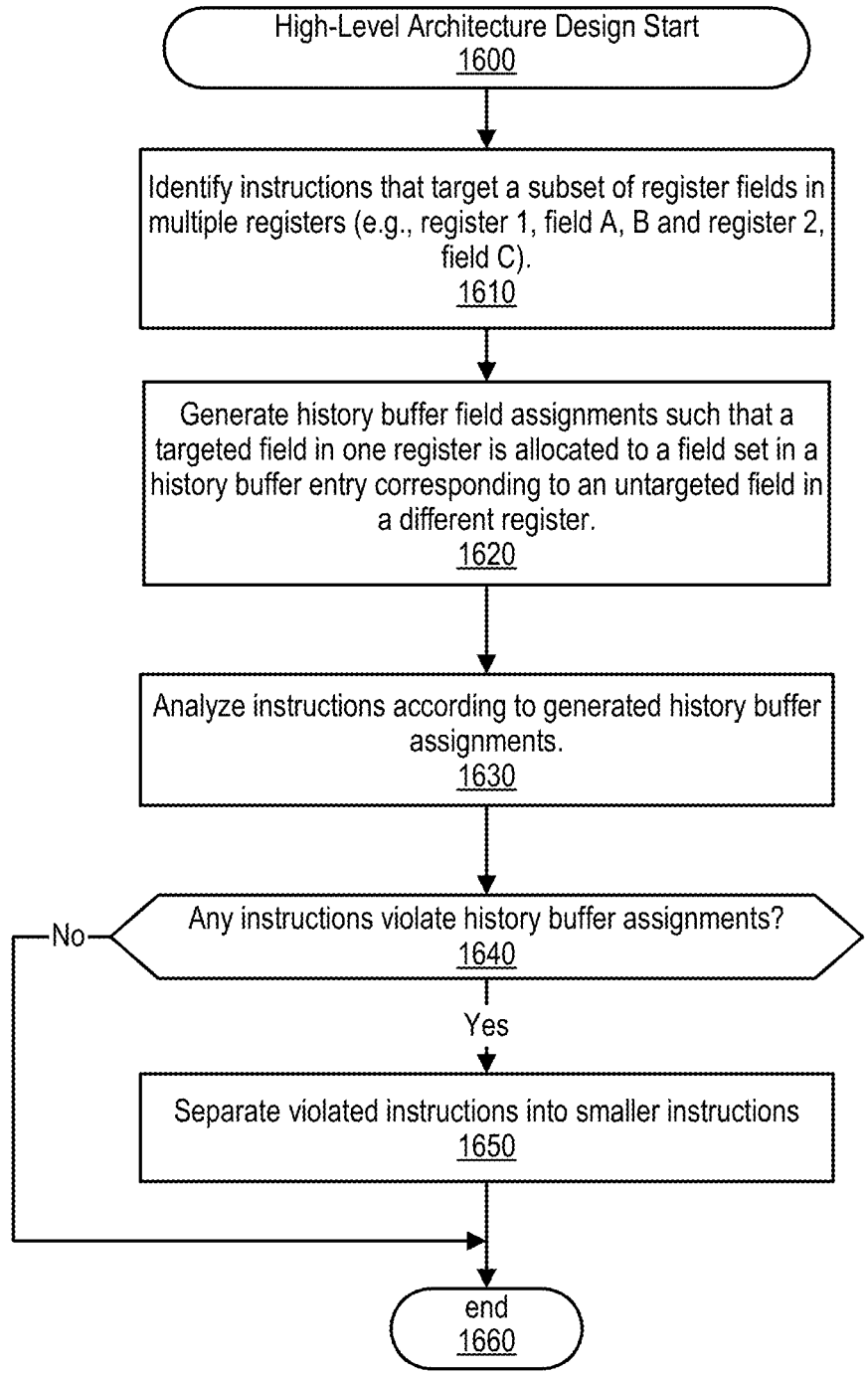
FIG. 16 is an exemplary diagram depicting steps to identify instructions during an architecture design phase that are capable of utilizing a hybrid history buffer entry embodiment discussed herein.

FIG. 16 is an exemplary diagram depicting steps to identify instructions during an architecture design phase that are capable of utilizing a hybrid history buffer entry embodiment discussed herein. Processing commences at 1600 whereupon, at step 1610, the process identifies instructions that target a subset of register fields from multiple register types. For example, an instruction may target fields A and B in register 1 (type X) while concurrently targeting field C in register 2 (type Y).

At step 1620, the process generates history buffer field assignments for the identified instructions such that a targeted field in one register is allocated to a field set in a history buffer entry corresponding to an untargeted field in a different register. Using the example above, the process assigns register 2's field C to a history buffer entry area that would normally store content from register 1's field C, which is not preserved for the particular instruction. In one embodiment, the registers are the same register type. In another embodiment, the registers are a different register type, such as that shown in FIG. 8.

At step 1630, the process analyzes instructions according to the generated history buffer assignments, and then determines as to whether any instructions violate the history buffer assignments (decision 1640). For example, an "Add Carrying with recording" instruction targets both a "Decimal Carries" field and a Condition Register field. "Decimal Carries" is a seldom-targeted field and therefore its position in a history buffer entry may be replaced by a Condition Register field. If any instructions violate the history buffer assignments, then decision 1640 branches to the 'yes' branch whereupon, at step 1650, the process breaks the violated instructions into smaller instructions in order to optimize the history buffer assignments. On the other hand, no instructions violate the history buffer assignments, then decision 1640 branches to the 'no' branch and FIG. 16 processing thereafter ends at 1660.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving first dispatch information corresponding to a first instruction that identifies a first register and a first register type, wherein the first dispatch information targets first content stored in the first register;
   determining a required amount of first history buffer field sets to store the first content;
   dynamically formatting a first history buffer entry in a history buffer to include a plurality of first history buffer field sets that accommodates the required amount of first history buffer field sets, wherein each one of the plurality of first history buffer field sets comprises a plurality of first fields and a first itaq field;
   storing the first content from the first register into the plurality of first history buffer field sets in the first history buffer entry;
   receiving second dispatch information corresponding to a second instruction that identifies a second register and a second register type, wherein the second dispatch information targets second content stored in the second register;
   determining a required amount of second history buffer field sets to store the second content;
   dynamically formatting a second history buffer entry in the history buffer to include a plurality of second history buffer field sets that accommodates the required amount of second history buffer field sets, wherein each one of the plurality of second history buffer field sets comprises a plurality of second fields and a second itaq field; and
   storing the second content from the second register into the plurality of second history buffer field sets in the second history buffer entry.

2. The method of claim 1 further comprising:
   storing a first indicator in a first register type field located in the first history buffer entry that identifies the first register type; and
   storing a second indicator in a second register type field located in the second history buffer entry that identifies the second register type, wherein the first register type and the second register type are different register types.

3. The method of claim 1 wherein:
   each of the plurality of first history buffer field sets includes the first itag field, resulting in a plurality of first itag fields included in the first history buffer entry; and
   each of the plurality of second history buffer field sets includes the second itag field, resulting in a plurality of second itag fields included in the second history buffer.

4. The method of claim 3 further comprising:
   allocating a first data field in each of the plurality of first history buffer field sets based upon the first register type, resulting in a plurality of first data fields included in the first history buffer entry; and
   allocating a second data field in each of the plurality of second history buffer field sets based upon the second register type, resulting in a plurality of second data fields included in the second history buffer entry.

5. The method of claim 3 further comprising:
   retrieving the first content from a subset of a plurality of first register fields included in the first register, wherein a different subset of the plurality of first register fields is not targeted by the first dispatch information; and
   storing the first content in a subset of the plurality of first history buffer field sets.

6. The method of claim 5 wherein the first history buffer entry comprises a single etag field, the method further comprising:
   storing, in the single etag field, an etag value that corresponds to an instruction address of the first instruction.

7. The method of claim 1 wherein the first register is partitioned into a first group of fields and a second group of fields, and wherein the first content is retrieved from the first group of fields, the method further comprising:
   receiving third dispatch information corresponding to a third instruction that identifies the second group of fields in the first register;
   retrieving third content from the second group of fields in the first register; and
   storing the third content in a dynamically configured third history buffer entry.

8. The method of claim 1 wherein each of the plurality of first history buffer field sets includes at least the first itag field, an itag valid field, a data field, a data valid field, and a field valid field.

9. An information handling system comprising:
   one or more processors;
   a memory coupled to at least one of the processors; and
   a set of computer program instructions stored in the memory and executed by at least one of the processors in order to perform actions of:
      receiving first dispatch information corresponding to a first instruction that identifies a first register and a first register type, wherein the first dispatch information targets first content stored in the first register;
      determining a required amount of first history buffer field sets to store the first content;
      dynamically formatting a first history buffer entry in a history buffer to include a plurality of first history buffer field sets that accommodates the required amount of first history buffer field sets, wherein each one of the plurality of first history buffer field sets comprises a plurality of first fields and a first itag field;
      storing the first content from the first register into the plurality of first history buffer field sets in the first history buffer entry;
      receiving second dispatch information corresponding to a second instruction that identifies a second register and a second register type, wherein the second dispatch information targets second content stored in the second register;
      determining a required amount of second history buffer field sets to store the second content;
      dynamically formatting a second history buffer entry in the history buffer to include a plurality of second history buffer field sets that accommodates the required amount of second history buffer field sets, wherein each one of the plurality of second history buffer field sets comprises a plurality of second fields and a second itag field; and
      storing the second content from the second register into the plurality of second history buffer field sets in the second history buffer entry.

10. The information handling system of claim 9 wherein the one or more processors perform additional actions comprising:
    storing a first indicator in a first register type field located in the first history buffer entry that identifies the first register type; and
    storing a second indicator in a second register type field located in the second history buffer entry that identifies the second register type, wherein the first register type and the second register type are different register types.

11. The information handling system of claim 9 wherein:
    each of the plurality of first history buffer field sets includes the first itag field, resulting in a plurality of first itag fields included in the first history buffer entry; and
    each of the plurality of second history buffer field sets includes the second itag field, resulting in a plurality of second itag fields included in the second history buffer.

12. The information handling system of claim 11 wherein the one or more processors perform additional actions comprising:
    allocating a first data field in each of the plurality of first history buffer field sets based upon the first register type, resulting in a plurality of first data fields included in the first history buffer entry; and
    allocating a second data field in each of the plurality of second history buffer field sets based upon the second register type, resulting in a plurality of second data fields included in the second history buffer entry.

13. The information handling system of claim 11 wherein the one or more processors perform additional actions comprising:
    retrieving the first content from a subset of a plurality of first register fields included in the first register, wherein a different subset of the plurality of first register fields is not targeted by the first dispatch information; and
    storing the first content in a subset of the plurality of first history buffer field sets.

14. The information handling system of claim 13 wherein the first history buffer entry comprises a single etag field, and wherein the one or more processors perform additional actions comprising:
    storing, in the single etag field, an etag value that corresponds to an instruction address of the first instruction.

15. A computer program product stored in a computer readable storage medium, comprising computer program code that, when executed by an information handling system, causes the information handling system to perform actions comprising:
    receiving first dispatch information corresponding to a first instruction that identifies a first register and a first register type, wherein the first dispatch information targets first content stored in the first register;
    determining a required amount of first history buffer field sets to store the first content;
    dynamically formatting a first history buffer entry in a history buffer to include a plurality of first history buffer field sets that accommodates the required amount of first history buffer field sets, wherein each one of the plurality of first history buffer field sets comprises a plurality of first fields and a first itaq field;
    storing the first content from the first register into the plurality of first history buffer field sets in the first history buffer entry;
    receiving second dispatch information corresponding to a second instruction that identifies a second register and a second register type, wherein the second dispatch information targets second content stored in the second register;
    determining a required amount of second history buffer field sets to store the second content;
    dynamically formatting a second history buffer entry in the history buffer to include a plurality of second history buffer field sets that accommodates the required amount of second history buffer field sets, wherein each one of the plurality of second history buffer field sets comprises a plurality of second fields and a second itag field; and
    storing the second content from the second register into the plurality of second history buffer field sets in the second history buffer entry.

16. The computer program product of claim 15 wherein the actions further comprise:
    storing a first indicator in a first register type field located in the first history buffer entry that identifies the first register type; and
    storing a second indicator in a second register type field located in the second history buffer entry that identifies the second register type, wherein the first register type and the second register type are different register types.

17. The computer program product of claim 15 wherein:
    each of the plurality of first history buffer field sets includes the first itag field, resulting in a plurality of first itag fields included in the first history buffer entry; and
    each of the plurality of second history buffer field sets includes the second itag field, resulting in a plurality of second itag fields included in the second history buffer.

18. The computer program product of claim 17 wherein actions further comprise:
    allocating a first data field in each of the plurality of first history buffer field sets based upon the first register type, resulting in a plurality of first data fields included in the first history buffer entry; and
    allocating a second data field in each of the plurality of second history buffer field sets based upon the second register type, resulting in a plurality of second data fields included in the second history buffer entry.

19. The computer program product of claim 17 wherein the actions further comprise:
    retrieving the first content from a subset of a plurality of first register fields included in the first register, wherein a different subset of the plurality of first register fields is not targeted by the first dispatch information; and
    storing the first content in a subset of the plurality of first history buffer field sets.

20. The computer program product of claim 19 wherein the first history buffer entry comprises a single etag field, and wherein the actions further comprise:
    storing, in the single etag field, an etag value that corresponds to an instruction address of the first instruction.

* * * * *